Patented Nov. 25, 1952

2,619,498

UNITED STATES PATENT OFFICE 2,619,498

OMEGA TRICHLOROPENTYL DERIVATIVES OF CYANOACETIC, MALONIC, AND ACETOACETIC ESTERS

Elbert C. Ladd, Passaic, N. J., assignor to United States Rubber Company, New York, N. Y., a corporation of New Jersey No Drawing. Application September 3, 1949, Serial No. 114,074

3 Claims. (Cl. 260—465.4)

This invention relates to new chemical compounds having the formula

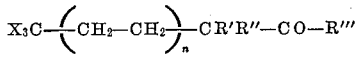

where X is from the group consisting of fluorine, chlorine and bromine; $n$ is an integer from 2 to 6; R' is from the group consisting of hydrogen and alkyl; R'' is from the group consisting of alkanoyl, carboxyl, carbalkoxy and carbonitrilo; and R''' is alkoxy, and to a method of synthesizing the same.

I have found that these new chemicals can be synthesized from compounds containing a trihalogenomethyl group and at least one additional halogen atom and having the formula

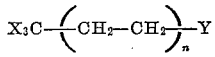

where X and Y are halogen from the group consisting of fluorine, chlorine and bromine; and $n$ is an integer from 2 to 6, by reacting such a compound with a compound having the formula $$M-CR'R''-CO-R'''$$

where M is an alkali metal, such as sodium, potassium and lithium; R' is selected from the group consisting of hydrogen and alkyl; R'' is from the group consisting of alkanoyl, carboxyl, carbalkoxy and carbonitrilo, and R''' is alkoxy.

The reaction is as follows:

(1)

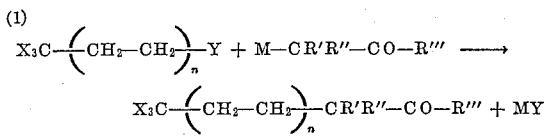

This reaction is particularly surprising since the second reagent reacts with those polyhalogenoalkyl compounds corresponding to the first reagent but wherein $n$ is equal to one to yield only unsaturated compounds as indicated in the following reaction:

(2) $X_3C-CH_2-CH_2-Y + M-CR'R''-CO-R''' \rightarrow X_2C=CH-CH_2-CR'R''-CO-R''' + MY + HX$ The present invention is, therefore, based upon my discovery that when $n$ is an integer from 2 to 6 in the formula given above for the first reactant, the reaction proceeds as in (1) above to yield chiefly or solely the product containing the terminal trihalogenomethyl group, $-CX_3$, intact. Indeed the corresponding unsaturated compounds can be obtained in significant amounts in the practice of my invention only if the most stringent reaction conditions are employed, i. e., high temperatures, long reaction times and a large excess of the reagent, M—CR'R''—CO—R'''.

The polyhalogenoalkyl compounds,

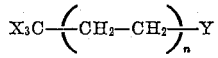

employed as starting materials in my invention can, as is now well known in the art, be readily prepared by reacting ethylene with an excess of a tetrahalogenomethane CX'$_3$Y' (X' and Y' being chlorine or bromine, but Y' being chlorine only when each X' is chlorine) at 25–120° C. and in the presence of a source of free radicals such as peroxidic compounds, including organic peroxides, e. g., benzoyl peroxide and tertiary-butyl hydroperoxide. The corresponding fluoro compounds (i. e., where X' and/or Y' are fluorine) are best prepared from the above adducts by treatment with a fluorinating agent, e. g., SbF$_3$Cl$_2$. The preparation of such starting materials is illustrated below:

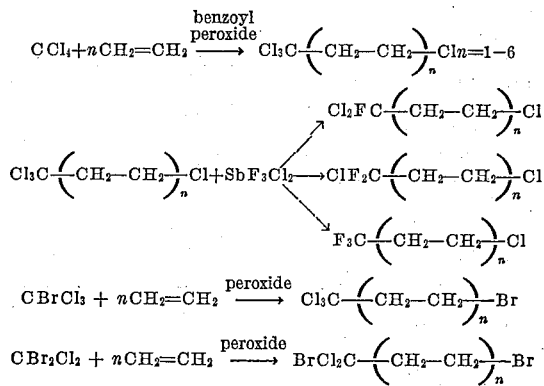

As previously stated, those polyhalogenoalkyl compounds of the class defined in which $n$ is an integer from 2 to 6 are the operable class in my present invention, since the related homologous compounds in which $n$ is equal to one react with the compounds, M—CR'R''—CO—R''', in an entirely different manner.

Examples of the polyhalogenoalkyl compounds containing a trihalogenomethyl group which may be used as starting materials in my invention are:

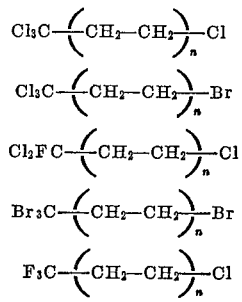

where $n=2$ to 6.

The compounds reactive with the polyhalogenoalkyl starting materials to form my new compounds according to reaction (1) above are represented by the type formula

M—CR'R''—CO—R''' where M is an alkali metal such as sodium, potassium, or lithium; R' is hydrogen or alkyl; R'' is alkanoyl, especially methanoyl, carboxyl and certain groups which are hydrolyzable to carboxyl, viz, carbalkoxy, e. g. carbomethoxy, and carbonitrilo; and R''' is alkoxy. These compounds all contain a highly activated methylene group, containing, as they do, two unsaturated (i. e., multiply bonded) activating groups (—C=O or —C≡N) attached to the methylene group, the unsaturated groups being in conjugated relation with the methylene hydrogen.

Examples of the alkali metal-containing reactants which may be used in the practice of my invention are alkali metal derivatives of the following types of compounds wherein an active or "acidic" hydrogen atom in the activated methylene group has been replaced with alkali metal; alkyl cyanoacetates, dialkyl esters of malonic acid, dialkyl esters of alkyl malonic acids, alkyl esters of acetoacetic acid, etc. Examples of specific alkali metal derivatives of these types are sodio ethyl cyanoacetate, sodio diethyl malonate, sodio diethyl alpha-ethyl malonate, and potassio ethyl acetoacetate.

The new compounds of my invention are useful as solvents and as synthetic organic intermediates for the preparation of dyes, plasticizers, polymers, lube-oil additives and pharmaceuticals.

The preparation of my new compounds is carried out by heating mixtures, preferably approximately equimolar mixtures, of the two reactants as defined above. Only moderate heating at temperatures of the order of 50° to 100° C. is ordinarily required and short reaction times in the range of 1 to 10 hours are usually sufficient. A solubilizing diluent is preferably employed to facilitate the reaction. Among the suitable diluents are p-dioxane and alcohols such as methanol, ethanol, propanol and butanol. The reaction products can be isolated from the reaction mixture in any suitable manner as by evaporation, filtration, extraction, crystallization, fractional distillation, etc.

The following examples disclose my invention in more detail. All parts are by weight.

*Example 1*

To a solution of 113.06 parts of ethyl cyanoacetate in 200 parts of p-dioxane at 70° C. are added 23 parts of sodium in the course of 10 hours. Two hundred and ten parts of 1,1,1,5-tetrachloropentane are then added with stirring and the reaction mixture is heated at 70° C. for 5 hours. The reaction mixture is then cooled, filtered and the filtrate is washed with 3 volumes of water, dried and fractionally distilled. In this manner, 24.4 parts of the new compound ethyl alpha-cyano-alpha-(5,5,5-trichloropentyl) acetate are obtained, B. 131–2° C./0.5–0.6 mm.; $n_D^{20}$ 1.4763; chlorine, 36.55% (theory, 37.14%).

*Example 2*

Twenty-three parts of sodium are dissolved in about 320 parts of ethanol and the resulting solution is mixed with 210 parts of 1,1,1,5-tetrachloropentane and 193.9 parts of diethyl alpha-ethylmalonate. This mixture is heated at reflux until neutral, which requires about 6 hours, after which the solvent and unreacted starting materials are removed by fractional distillation. The 129 parts of residual liquid is slightly impure diethyl alpha-ethyl-alpha-(5,5,5-trichloropentyl) malonate, $n_D^{20}$ 1.4678; chlorine, 27.40% (theory, 24.49%).

Having thus described my invention, what I claim and desire to protect by Letters Patent is:

1. Ethyl alpha-cyano-alpha-(5,5,5-trichloropentyl) acetate.
2. Diethyl alpha-ethyl-alpha-(5,5,5-trichloropentyl) malonate.
3. A new chemical compound having the formula $$Cl_3C—CH_2—CH_2—CH_2—CH_2—Z$$

where Z is a radical selected from the group consisting of $$-CH\begin{smallmatrix}CO-OAlkyl\\CN\end{smallmatrix} \quad -CH\begin{smallmatrix}CO-OAlkyl\\CO-OAlkyl\end{smallmatrix} \quad -C\begin{smallmatrix}CO-OAlkyl\\Alkyl\\CO-OAlkyl\end{smallmatrix}$$

and $$-CH\begin{smallmatrix}CO-OAlkyl\\C=O\\CH_3\end{smallmatrix}$$

the alkyl group in each instance being lower alkyl.

ELBERT C. LADD.

REFERENCES CITED

The following references are of record in the file of this patent:

UNITED STATES PATENTS

| Number | Name | Date |
|---|---|---|
| 2,425,426 | Joyce | Aug. 12, 1947 |

OTHER REFERENCES

Lynn: "Organic Chemistry" (3rd ed., Lea and Febiger), p. 115 (1948).

Huber et al.: Chem. Abstr., vol. 40, col. 85 (1946).

Fischer et al. and Blaise et al.: Beilstein (Handbuch, 4th ed.), vol. 2, sup., p. 278 (1929).

Voorhees et al.: Beilstein (Handbuch, 4th ed.), vol. 2, 2nd sup., p. 594 (1942).